June 24, 1969 J. H. MARTIN ET AL 3,452,136
ANTIBIOTIC AF283 AND PRODUCTION THEREOF
Filed April 17, 1968 Sheet 1 of 2

INVENTORS
JOHN HENRY MARTIN
JOHN NORMAN PORTER
BY LESTER ALLEN MITSCHER

Norton S. Johnson
ATTORNEY

United States Patent Office 3,452,136
Patented June 24, 1969

3,452,136
ANTIBIOTIC AF283 AND PRODUCTION THEREOF
John Henry Martin, New City, N.Y., John Norman Porter, Ramsey, N.J., and Lester Allen Mitscher, Columbus, Ohio, assignors to American Cyanamid Company, Stamford, Conn., a corporation of Maine
Continuation-in-part of application Ser. No. 645,501, June 12, 1967. This application Apr. 17, 1968, Ser. No. 725,576
Int. Cl. A61k 21/00; C12k 1/00
U.S. Cl. 424—118    6 Claims

ABSTRACT OF THE DISCLOSURE

A new antibiotic is produced, designated AF283 by cultivating a new strain of microorganism known as *Streptomyces filipinensis*. The new antibiotic is active against both gram-positive and gram-negative bacteria and is thus useful in inhibiting the growth of such bacteria wherever they may be found.

---

Figure 1:
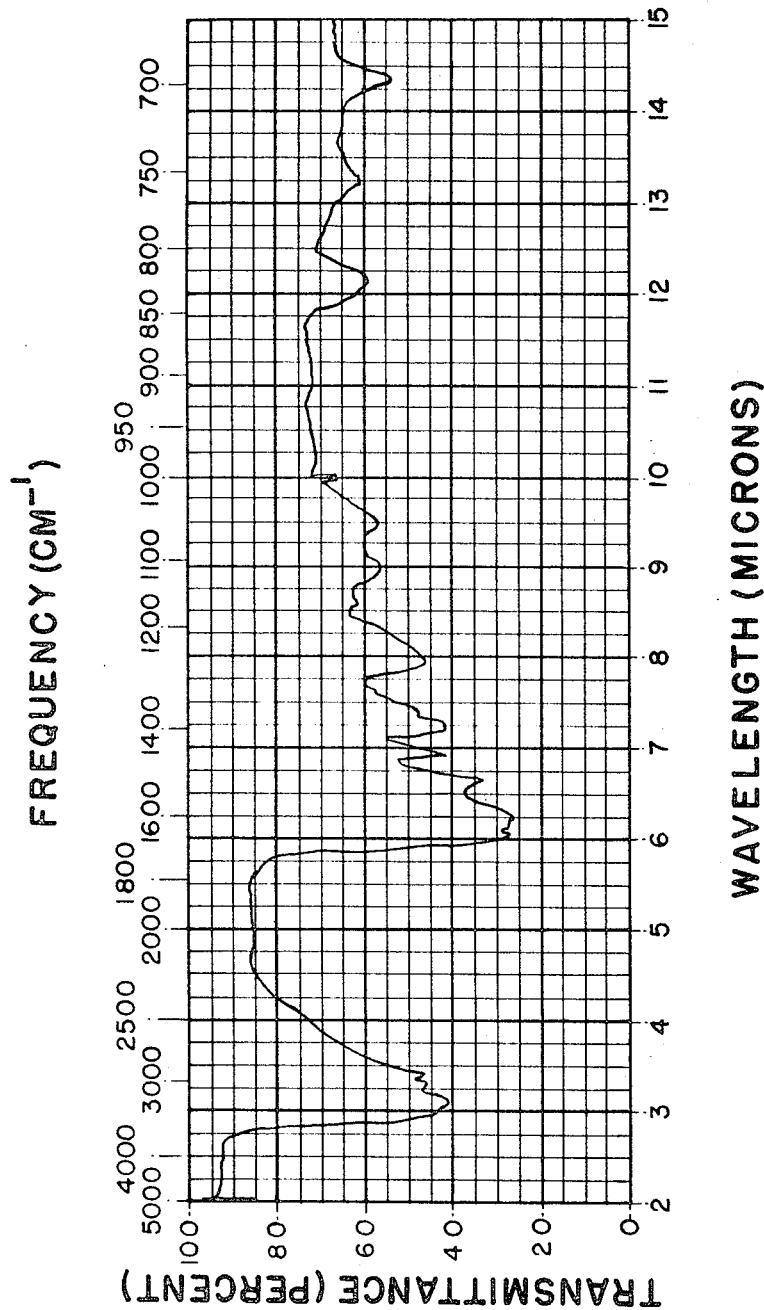

This application is a continuation-in-part of our copending application Serial No. 645,501, filed June 12, 1967, now abandoned which, in turn, is a continuation-in-part of our application Serial No. 564,689, filed July 12, 1966, now abandoned.

This invention relates to a new antibiotic, to its production by fermentation, to methods for its recovery and concentration from crude solutions, to processes for its purification and to methods for the preparation of its salts and other derivatives.

The present invention includes within its scope the antibiotic in dilute forms, as crude concentrates and in pure crystalline forms. These novel products are active against a variety of microorganisms including gram-positive and gram-negative bacteria. The effects of the new antibiotic on specific bacteria and mycoplasma together with its chemical and physical properties, differentiate it from previously described antibiotics.

The new antibiotic, which we have designated AF283, is formed during the cultivation under controlled conditions of a new strain of *Streptomyces filipinensis*. The new antibiotic-producing streptomycete was isolated from a soil sample collected in the Dominican Republic. A viable culture of the organism has been deposited with the Culture Collection Laboratory, Northern Utilization Research and Development Division, United States Department of Agriculture, Peoria, Ill., and has been added to its permanent collection. It is freely available in this repository under its Accession No. NRRL 3217.

The following is a general description of the organism *S. filipinensis*, NRRL 3217, based on diagnostic characteristics observed. The underscored descriptive colors and color chip designations are taken from Jacobson et al., "Color Harmony Manual," 3rd ed. (1948).

Amount of growth.—Moderate to good on most media; light to very light on Czapek's Solution Agar and Hickey and Treshner's Agar.

Aerial mycelium and/or en masse spore color.—Aerial mycelium whitish to yellowish white, becoming Silver Gray (3 fe) to Beige (3 ge) in sporulation zones.

Soluble pigment.—In yellowish shades and in light to moderate amounts on most media; abundant on Tomato Paste Oatmeal and Potato Dextrose Agars; none on Czapek's Solution, Hickey and Treshner's and Inorganic Salts-Starch Agars.

Reverse colors.—In yellow to tan to organge shades on most media.

Miscellaneous physiological reactions.—Nitrates not reduced in organic nitrate broth; only partial liquefaction of gelatin after 14 days; culture is chromogenic (produces melanin) on peptone-iron agar. Carbon source utilization according to Pridham et al. [ J. Bact., 56:107–114 (1948)] as follows: good utilization of 1-arabinose, d-fructose, lactose, d-mannitol, d-melibiose, d-trehalose, d-xylose and dextrose; poor to non-utilization of adonitol, dextran, i-inositol, d-melezitose, d-raffinose, 1-rhamnose, salicin and sucrose.

Morphology.—Spore chains produced on the aerial mycelium in the form of hooks, loops, coils and occasionally spirals of a few turns. Spores subglobose to elliptical, 0.6–0.7$\mu$ x 0.7–0.9$\mu$. Spores ornamented with short to medium obtuse spines as determined by electron microscopy.

A comparison was made between culture NRRL 3217 and those reference cultures of streptomycetes having the combination of: grayish spores, spiny spores, spiralled spore chains, and production of melanin on peptone-iron agar. The new isolate most closely corresponds to the strains of *Streptomyces filipinensis*. When it was then compared with the original description of that species, as described in The Actinomycetes, vol. II, Waksman, S. A., The Williams & Wilkins Co., Baltimore (1961), an equally close similarity was found. Therefore, in view of the lack of any significant divergence from the specific concept for *S. filipinensis*, culture NRRL 3217 will hereafter be considered a strain of that species.

A critical examination of the cultural, physiological and morphological features of the organism was made when it was grown on several media; including those recommended by Pridham et al. ["A Selection of Media for Maintenance and Taxonomic Study of Streptomyces," Antibiotics Annual (1956–1957), pp. 947–953]. Detailed observations are recorded in Tables I, II, III, and IV below. Underscored descriptive colors are taken from the "Color Harmony Manual."

TABLE I.—CULTURAL CHARACTERISTICS OF *STREPTOMYCES FILIPINENSIS* NRRL 3217

[Incubation: 14 days; Temperature: 28° C.]

| Medium | Amount of growth | Aerial mycelium and/or spores | Soluble pigment | Reverse color | Remarks |
|---|---|---|---|---|---|
| Czapek's Solution Agar | Very light | Aerial mycelium white, thin. Sporulation grayish, very light. | None | Whitish | |
| Asparagine Dextrose Agar | Moderate | Aerial mycelium yellowish white, becoming Silver Gray (3 fe) in sporulation zones. Sporulation light. | Yellowish; light | Maize (2 hb) | |
| Tomato Paste Agar | do | Aerial mycelium yellowish white, becoming Silver Gray (3 fe) in sporulation zones. Sporulation moderate. | None | Lt. tan (3 gc) | |
| Hickey & Tresner's Agar | Light | Aerial mycelium yellowish white, becoming Silver Gray (3 fe) to Beige (3 ge) in sporulation zones. Sporulation light. | do | Lt. tan (3 gc) | |

TABLE I.—CULTURAL CHARACTERISTICS OF *STREPTOMYCES FILIPINENSIS* NRRL 3217—Continued

| Medium | Amount of growth | Aerial mycelium and/or spores | Soluble pigment | Reverse color | Remarks |
|---|---|---|---|---|---|
| Yeast Extract Agar | Moderate | Aerial mycelium whitish, becoming Silver Gray (3 fe) to Beige (3 ge) in sporulation zones. Sporulation good. | Yellowish; light | Yellow maple (3 ng) | |
| Oatflake Agar | Good | Aerial mycelium whitish, becoming Silver Gray (3 fe) to Beige (3 ge) in sporulation zones. Sporulation good. | Yellowish; moderate | Lt. wheat (2 ea) | |
| Carvajal's Oatmeal Agar | do | Aerial mycelium yellowish white, becoming Silver Gray (3 fe) in sporulation zones. Sporulation heavy. | Yellowish; light | Yellow maple (3 ng) | Colony surface cracked and wrinkled. |
| Tomato Paste Oatmeal Agar | do | Aerial mycelium yellowish white, becoming Silver Gray (3 fe) to Beige (3 ge) in sporulation zones. Sporulation good. | Yellowish; abundant | Amber (3 lc) | |
| Potato Dextrose Agar | do | Aerial mycelium yellowish white, becoming Silver Gray (3 fe) in sporulation areas. Sporulation good. | do | Maple (4 le) | |
| Bennett's Agar | Moderate | Aeria mycelium whitish, becoming Silver Gray (3 fe) to Beige (3 ge) in sporulating areas. Sporulation good. | Yellowish; light | Yellow maple (3 ng) | |
| Inorganic Salts Starch Agar | do | Aerial mycelium whitish, becoming Silver Gray (3 fe) to Beige (3 ge) in sporulating areas. Sporulation good. | None | Light wheat (2 ea) | |

TABLE II.—MICROMORPHOLOGY OF *STREPTOMYCES FILIPINENSIS* NRRL 3217

| Medium | Aerial mycelium and/or sporiferous structures | Spore shape | Spore size | Spore surface |
|---|---|---|---|---|
| Oatflake Agar | Spore chains produced on the aerial mycelium in the form of hooks, loops, coils and occasionally spirals of a few turns. | Spores subglobose to elliptical. | 0.6–0.7μ x 0.7–0.9μ | Spores ornamented with short to medium obtuse spines (as determined by electron microscopy). |

TABLE III.—MISCELLANEOUS PHYSIOLOGICAL REACTION OF *STREPTOMYCES FILIPINENSIS* NRRL 3217

[Temperature 28° C.]

| Medium | Incubation period | Amount of growth | Physiological reaction |
|---|---|---|---|
| Organic nitrate broth | 7 days | Moderate | No nitrate reduction. |
| Do | 14 days | Good | Do. |
| Gelatin | 7 days | Moderate | No gelatin liquefaction. |
| Do | 14 days | Good | Partial liquefaction. |
| Peptone-Iron agar | 24 hours | do | Chromogenic (melanin produced). |

Table IV.—Carbon source utilization pattern of *Streptomyces filipinensis* NRRL 3217

[Incubation: 10 days. Temperature: 28°]

| Carbon source: | Utilization [1] |
|---|---|
| Adonital | 0 |
| l-arabinose | 3 |
| Dextran | 0 |
| d-Fructose | 3 |
| i-Inositol | 0 |
| Lactose | 3 |
| d-Mannitol | 3 |
| d-Melezitose | 0 |
| d-Melibiose | 3 |
| d-Raffinose | 1 |
| l-rhamnose | 0 |
| Salicin | 1 |
| Sucrose | 0 |
| d-Trehalose | 3 |
| d-Xylose | 3 |
| Dextrose | 3 |
| Negative control | 0 |

[1] 3, good utilization; 2, fair utilization; 1, poor utilization; 0, no utilization.

It is to be understood that for the production of the new antibiotic the present invention is not limited to this particular organism only, nor to organisms fully answering the above growth and microscopic characteristics which are given for illustrative purposes. In fact, it is desired and intended to include the use of mutants produced from the described organism by various means, such as X-radiation, ultraviolet radiation, nitrogen mustard, phage exposure and the like.

The fermentation process

Cultivation of the organism *S. filipinensis*, NRRL 3217, may be carried out in a wide variety of liquid culture media. Media which are useful for the production of the novel antibiotic include an assimilable source of carbon such as starch, sugar, molasses, glycerol, etc., an assimilable source of nitrogen such as protein, protein hydrolysate, polypeptides, amino acids, corn steep liquor, etc., and inorganic anions and cations, such as potassium, sodium, calcium, sulfate, phosphate, chloride, etc. Trace elements such as boron, molybdenum, copper, etc. are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1% octadecanol, in lard oil may be added as needed.

Inoculum preparation

Shaker flask inoculum of *S. filipinensis* is prepared by inoculating 100 milliliters of sterile liquid medium in 500 milliliter flasks with scrapings or washings of spores from an agar slant of the culture. The following medium is ordinarily used.

| | Grams |
|---|---|
| Molasses | 20 |
| Glucose | 10 |
| Bactopeptone | 5 |
| Water to 1,000 milliliters. | |

The flasks are incubated at a temperature from 25-29° C., preferably 28° C., and agitated vigorously on a rotary shaker for 30 to 48 hours. These 100 milliliters of inocula are used to inoculate 1 liter and 12 liter batches of the same medium in 2 liter and 20 liter glass fermentors. The inoculum mash is aerated with sterile air while growth is continued for 30 to 48 hours. These batches of inocula are used to inoculate tank fermentors.

Tank fermentation

For the production of the antibiotic in tank fermentors the following fermentation medium is preferably used.

|  | Grams |
|---|---|
| Soy bean flour | 40 |
| Cerelose | 20 |
| Calcium carbonate | 2 |
| Water to 1,000 milliters. | |

Each tank is inoculated with 3 to 10% of inoculum made as described above. Aeration is supplied at the rate of 0.5–1.0 liter of sterile air per liter of broth per minute and the fermenting mixture is agitated by an impeller driven at 200–400 r.p.m. The temperature is maintained at 25–29° C., usually at 28° C. The fermentation is ordinarily continued for 65–90 hours at which time the mash is harvested.

Isolation procedure

After the fermentation is completed, the fermented mash containing the antibiotic is filtered, preferably at about pH 2.5, to remove the mycelium. Diatomaceous earth or any other conventional inert filtration aid may be used to assist the filtration. Ordinarily the mycelial cake is washed with water and the wash is pooled with the filtrate. Optionally, the mycelial pad may be eluted with 70% aqueous methanol, the eluate filtered and concentrated to an aqueous phase. This concentrate may then be added into the beer filtrate of a subsequent fermentation to enhance the antibiotic activity available for recovery. Thereafter, the antibiotic may be recovered from the combined filtrate and wash using conventional techniques, as for example, by adsorption on activated carbon at about pH 6.5 and elution with acidic 75% acetone. The antibiotic-containing eluate is adjusted to about pH 3.0 to 4.0 and concentrated under reduced pressure to an aqueous phase having a volume slightly larger than one-hundredth of the original mash volume. The concentrate is adjusted to a pH of 6.0–6.5. The antibiotic in the concentrate is further purified by passing the concentrate through a weakly acidic cation exchange resin. The antibiotic which is retained on the resin is eluted and the eluate is concentrated and lyophilized to yield the semi-purified antibiotic.

Purification procedure

Futher purification of the antibiotic activity and its separation into two components, termed AF283α and AF283β may be effected by partition chromatography on diatomaceous earth or Celite or by displacement chromatography on CM Sephadex C-25 cation exchanger.

In the partition chromatography method, the semi-purified material is charged onto a column packed with acid-washed Celite which is wetted with the aqueous phase of a well-shaken mixture of 5 parts of sec-butanol and 4 parts of water. The column is then developed with the organic phase of this system to elute the desired α and β components separately as indicated by optical density readings at 270 m$\mu$. Fractions containing the α component are combined, desolventized and lyophilized to yield purified AF283α. In a similar manner fractions containing the other portion of the antibiotic activity, the β component, are combined, desolventized and lyophilized to yield purified AF283β.

In the displacement chromatography method the semi-purified antibiotic is charged onto a column packed with CM Sephadex which is previously treated with 0.1 N acetic acid for 48 hours, washed and equilibrated with 3% ammonium formate at pH 7.5. The charged column is then developed using addition 3% ammonium formate at pH 7.5. The eluate is monitored with ultraviolet absorption readings at about 254 m$\mu$ and appropriate fractions containing the α component are collected separately from fractions containing the β component. Both the α component and the β component may be recovered by repeated lyophilization of the respective eluates or, optionally, by adsorption on carbon followed by elution with aqueous acetone and subsequent lyophilization of the eluates.

The novel antibiotics of this invention are basic substances and in their free base form contain the elements carbon, hydrogen, oxygen, nitrogen in substantially the following percentages by weight (it will be noted that the α-component is quite hygroscopic as to free base and the amount of moisture remaining after drying affects the microanalytical figures which follow).

|  | Beta component | Alpha component | |
|---|---|---|---|
|  |  | Mild drying | Thorough drying |
| Carbon | 50.28 | 51.08 | 53.15 |
| Hydrogen | 6.77 | 7.59 | 6.34 |
| Oxygen (direct) | 26.09 | 27.88 | 26.35 |
| Nitrogen | 15.32 | 11.83 | 11.33 |

In this context, mild drying conditions consist of heating for three hours at 78° C. under reduced pressure in the presence of $P_2O_5$. Extensive drying consists of heating for 16 hours at 100° C. under reduced pressure in the presence of $P_2O_5$.

The following are various physical characteristics of the beta component:

Neutralization equivalent of the hydrochloride salt 864.

The optical rotation is $[\alpha]_D^{25} = -28.6°$ ($\pm 3$) (c.=0.874 in 0.01 N HCl).

Figure 2:
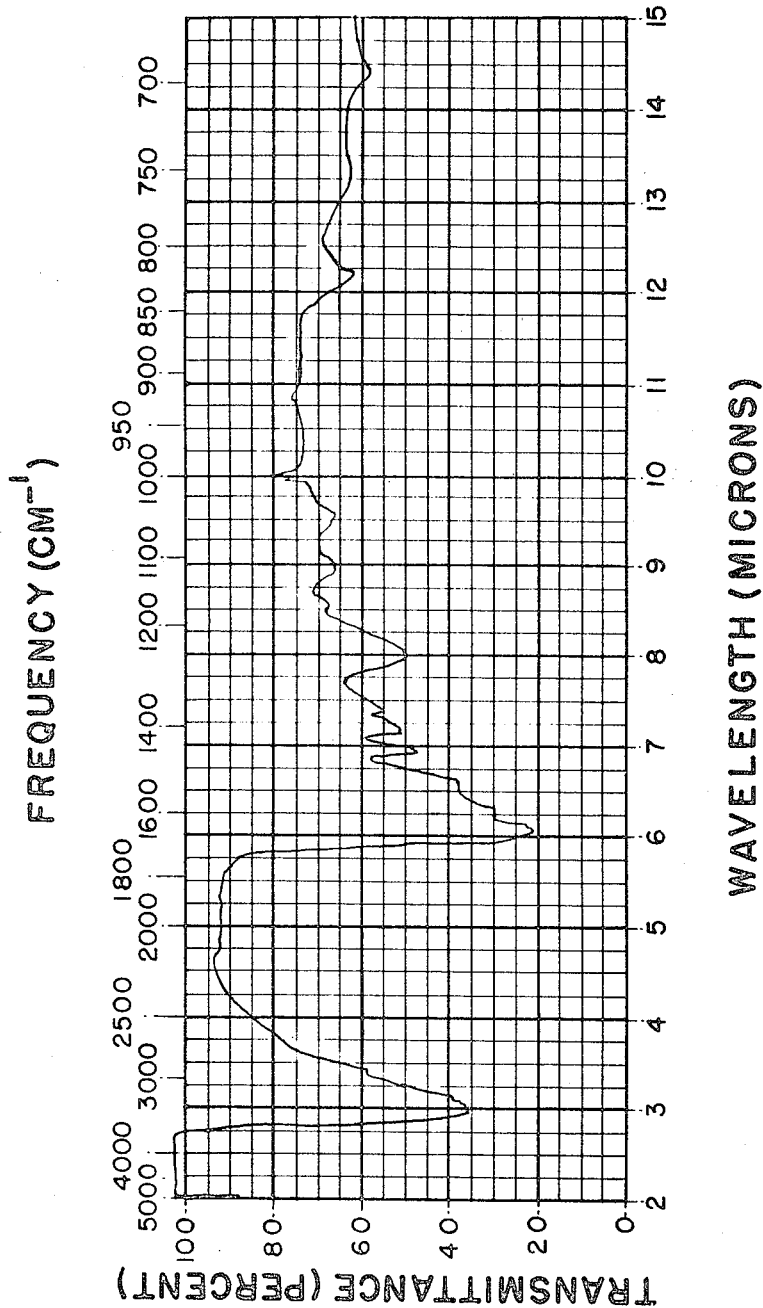

Ultraviolet maxima occur at:

264 m$\mu$ ($E_{1cm.}^{1\%} = 255$) in 0.1 N HCl 290 m$\mu$ ($E_{1cm.}^{1\%} = 315$) in 0.1 N NaOH 264 m$\mu$ ($E_{1cm.}^{1\%} = 275$) in methanol An infrared absorption spectrum in a KBr pellet is prepared in a standard manner. It exhibits characteristic absorption in the infrared region of the spectrum at the following wavelengths expressed in microns: 3.00, 3.43, 6.10, 6.32, 6.65, 6.95, 7.20, 7.43, 7.98, 8.55, 8.97, 9.52, 12.20, 13.25, 14.40. The infrared curve of the beta component is shown in FIGURE 2 of the accompanying drawings.

The antibiotic has no definitive melting point. On heating, it turns to a light tan at 134° C. and gradually darkens as the temperature is increased.

The beta component shows the following $R_f$ values in the solvent systems indicated below using bioautographs against *Corynebacterium xerosis* as the detection organism:

| $R_f$ value | Solvent system |
|---|---|
| 0.20 | 3% ammonium chloride (aqueous). |
| 0.58 | m-Cresol saturated with water with 2% perfluorobutyric acid added. |
| 0.01 | Chloroform, 10 parts; pyridine, 4 parts; acetic acid, 4 parts; water, 5 parts. |
| 0.01 | Sec-butanol, 3 parts; pyridine, 6 parts; s-collidine, 6 parts; water, 3 parts. |
| 0.80 | 90% phenol, 1 part; 2% dichloroacetic acid, 1 part. |

The beta component is highly soluble in water as an acidic or basic salt. It is moderately soluble in neutral water. It is insoluble in the common organic solvents such as hexane, diethyl ether, ethyl acetate, chloroform, n-butanol, benzene and the like.

The beta component, when spotted on paper, gives the following results:

Spray reagent: Color found
 Ninhydrin (0.25%) _____ Dark grey.
 p-Nitrobenzene-diazonium fluoroborate (1%) _____ Yellow.

It decolorizes aqueous $KMnO_4$ and gives an intense yellow color when treated with bromine in water ($\lambda_{max}$ 406-407 m$\mu$).

In neutral, concentrated, aqueous solutions, it forms insoluble adition salts with helianthic acid and Reinecke salt, etc. It readily reacts with a variety of acid halides and aryl-sulfonyl halides in alkaline solutions to form acylated products which are useful derivatives for characterization.

The following are various physical characteristics of the alpha component:

Neutralization equivalent of the hydrochloride salt 667.

The optical rotation is $[\alpha]_D^{25} = -6.1°$ ($\pm 2.3$) (c.=1.310 in 0.1 N HCl).

Ultraviolet maxima occur at:

$$263 \text{ m}\mu \ (E_{1cm}^{1\%} = 310 \text{ in } 0.1 \text{ NHCl})$$

$$290 \text{ m}\mu \ (E_{1cm}^{1\%} = 390) \text{ in } 0.1 \text{ NaOH}$$

An infrared absorption spectrum of the alpha component in a KBr pellet is prepared in a standard manner. It exhibits characteristic absorption in the infrared region of the spectrum at the following wavelengths expressed in microns: 3.10, 3.28, 3.43, 6.02, 6.25, 6.70, 6.95, 7.28, 7.44, 7.95, 9.00, 9.50, 12.20, 13.23, 14.30. The infrared curve of the alpha component is shown in FIGURE 1 of the accompanying drawings.

The alpha component shows the following $R_f$ values in the solvent system indicated below using bioautographs against *Corynebacterium xerosis* as the detection organism:

| $R_f$ value | Solvent system |
| --- | --- |
| 0.32 | 5% ammonium chloride. |
| 0.65 | 90% phenol:water plus 2% dichloroacetic acid (added to bottom phase). |
| 0.25 | m-Cresol:90% phenol:0.2M morpholine:0.2M acetic acid (5:5:7:3). |
| 0.24 | m-Cresol saturated with water plus 2% heptafluorobutyric acid (added to lower phase). |
| 0.24 | Sec.-butanol:acetic acid:water (1000:375:500). |

The novel antibiotic is active in vivo against a variety of gram-positive microorganisms, such as staphylococci and diplococci. The new antibiotic is thereby potentially useful as a therapeutic agent in treating bacterial infections in mammals caused by such microorganisms. The new antibiotic can be expected to be usefully employed for controlling such infections by topical application or parenteral administration or when taken orally.

The usefulness of the new antibiotic is demonstrated by its ability to control systemic lethal infections in mice. AF283 shows high in vivo antibacterial activity in mice against *Staphylococcus aureus*, strain Smith, *Staphylococcus aureus*, strain Rose, and *Diplocoscus pneumonia*, SVL, when administered by a single dose to groups of Carworth Farms CF-1 female mice, weight about 20 grams infected intraperitoneally with a lethal dose of these bacteria in trypticase soy broth (TSP) dilutions of a five-hour TSP blood culture.

Table V, following, illustrates the in vivo antibacterial activity of AF283$\beta$.

TABLE V.—IN VIVO ANTIBACTERIAL ACTIVITY OF AF283$\beta$
[5-6 Days Postinfection]

|  | Mg./kg. of body wt. | Survivors/total | |
| --- | --- | --- | --- |
|  |  | S.O.D.[1] | S.S.C.[2] |
| *Staphylococcus aureus* Strain Smith (Conc. $10^{-2}$). | 640 | 4/5 |  |
|  | 320 | 5/5 |  |
|  | 160 | 3/5 |  |
|  | 20 |  | 10/10 |
|  | 5 |  | 8/10 |
|  | 1.25 |  | 6/10 |
|  | 0.31 |  | 4/10 |
|  | 0.08 |  | 1/5 |
|  | 0.2 |  | 0/5 |
| *Staphylococcus aureus* Strain Rose (Conc. $10^0$). | 320 | 5/5 |  |
|  | 80 | 5/5 |  |
|  | 20 |  | 10/10 |
|  | 5 |  | 10/10 |
|  | 1.25 |  | 3/5 |
|  | 0.31 |  | 0/5 |
|  | 0.08 |  | 1/5 |
|  | 0.02 |  | 2/5 |
| *Diplococcus pneumoniae* SVI (Conc. $10^{-6}$). | 320 | 5/5 |  |
|  | 80 |  | 10/10 |
|  | 20 |  | 7/10 |
|  | 5 |  | 1/10 |
|  | 1.25 |  | 0/5 |

[1] S.O.D.=single oral dose.
[2] S.S.C.=single subcutaneous dose.

Two groups of controls were used: 20/20 and 48/50 of the infected non-treated controls died within one day.

TABLE VI.—IN VIVO ANTIBACTERIAL ACTIVITY OF AF283$\alpha$
[5-6 Days Postinfection]

|  | Mg./kg. body wt. | Survivors/ total S.S.C.[1] |
| --- | --- | --- |
| *Staphylococcus aureus* Smith strain | 80 | 5/5 |
|  | 20 | 10/10 |
|  | 5 | 10/10 |
|  | 1.2 | 5/10 |
|  | 0.3 | 1/10 |

[1] S.S.C.=single subcutaneous dose.

The new antibiotic possesses both in vivo and in vitro activity against *Mycoplasma gallisepticum*. Table VII below shows the in vitro activity of AF283 obtained against this organism.

TABLE VII.—IN VITRO ACTIVITY OF AF283 AGAINST *M. GALLISEPTICUM*
[Broth Bilution Test][1]

| Test compound | MiniAum inhibitory concentration (mcg./ml.) | |
| --- | --- | --- |
|  | A | B |
| AF283 | 1-10 | 10-100 |

[1] Plated out after 3, 7, and 14 days and checked for colonies after an additional 4 days incubation.
A=Turkey strain; B=S6 strain from chickens.

Table VIII shows the activity of AF283 against *M. gallisepticum* in one-week old chicks.

TABLE VIII.—IN VIVO ACTIVITY OF F283 AGAINST *M. GALLISEPTICUM* IN ONE-WEEK OLD CHICKS

| Test compound | Dose, mg./ bird | Avg. bird weights (days postinfection) | | | | Survivors | |
| --- | --- | --- | --- | --- | --- | --- | --- |
|  |  | 0 | 7 | 14 | 21 | S/T[1] | Percent S |
| AF283 | 6.25 | 68.6 | 117.5 | 172.6 | 255.5 | 19/20 | 95 |
| AF283 | 1.56 | 69.2 | 114.6 | 159.7 | 228.2 | 19/20 | 95 |
| AF283 | 0.39 | 68.4 | 114.2 | 153.6 | 222.3 | 19/20 | 95 |
| Infected (untreated) |  | 69.5 | 96.7 | 117.8 | 177.2 | 12/20 | 60 |
| Uninfected (untreated) |  | 70.2 | 124.4 | 194.7 | 293.8 | 20/20 | 100 |

[1] S/T=Survivors to total tested.

Twenty chicks per group, infection administered via air sac; single treatment at time of infection subcutaneously.

The above results against *M. gallisepticum* indicates a potentially important commercial use of the antibiotic in the cure or prevention of certain diseases affecting poultry flocks.

When tested in vitro at a concentration of 25γ/ml., the antibiotic was found to have pronounced antibacterial activity against *Corynebacterium xerosis*, NRRL B-1397 and slight activity against *Mycobacterium smegmatis*, No. 607 Stansly R-99 and *Staphylococcus aureus*, strain Smith.

The invention will be described in greater detail in conjunction with the following specific examples.

Example 1.—Inoculum preparation

A typical medium used to grow the primary inoculum is prepared according to the following formula:

| | Grams |
|---|---|
| Mollasses | 20 |
| Glucose | 10 |
| Bactopeptone | 5 |

Water to 1,000 milliliters.

The washed or scraped spores from an agar slant of *S. filipinensis* NRRL 3217 are used to inoculate two flasks containing 100 milliliters each of the above medium in 500 milliliter flasks. The flasks are placed on a rotary shaker and agitated vigorously for 48 hours at 28° C. The resulting flask inoculum is transferred to a 5 gallon glass fermentor containing 12 liters of sterile medium. The glass fermentor is aerated with sterile air while growth is carried out for about 48 hours, after which the contents are used to seed a 300 liter tank fermentor.

Example 2.—Fermentation

A fermentation medium is prepared according to the following formula:

| | Grams |
|---|---|
| Soy bean flour | 40 |
| Crelose | 20 |
| Calcium carbonate | 2 |
| Water to 1,000 milliliters. | |

The fermentation medium is sterilized at 120° C. with steam at 15 pounds pressure for 45–60 minutes. The pH of the medium after sterilization is 6.4. Three hundred liters of sterile medium in a 400 liter tank fermentor is inoculated with 12 liters of inoculum such as described in Example 1, and the fermentation is carried out at 28° C. using Hodag LG-8 oil as a defoaming agent. Aeration is supplied at the rate of 0.5 liter of sterile air per liter of mash per minute. The mash is agitated by an impeller driven at 300 revolutions per minute. At the end of approximately 70 hours of fermentation time the mash is harvested.

Example 3.—Isolation

Three hundred and thirty liters of the fermented mash from Example 2 is adjusted to pH 2.5 with concentrated hydrochloric acid and diatomaceous earth added in the portion of 3% weight per volume. The broth is filtered, the filter cake washed with 50 liters of water, and the filtrate and wash combined. The combined filtrate and washings are adjusted to pH 6.5 with sodium hydroxide and 1200 grams of Darco G-60 and 1200 grams of diatomaceous earth are added and the mixture stirred for 30 minutes and then filtered. The carbon pad is washed with water and the filtrate and washings are discarded. The antibiotic-rich carbon pad is slurried with 10 liters of 75% aqueous acetone and the slurry poured into a glass column having nine-inch diameter. The carbon column is eluted with a mixture of acetone, water and 2 N hydrochloric acid in the proportion of 75:22:3 by volume. Seven separate 9 liter fractions are collected and each fraction assayed for antibiotic activity using *C. xerosis* as the test organism. Fractions 4, 5, 6 and 7, containing the major portion of the eluted activity are combined. The combined fractions are adjusted to pH 3.5 with sodium hydroxide and concentrated under reduced pressure to an aqueous phase of approximately 4 liters.

The aqueous concentrate is adjusted to pH 6.0 to 6.5 with sodium hydroxide and further purified by ion exchange chromatography. A quantity of IRC-50 resin is washed with hydrochloric acid until the pH remains at 1.5 on standing. The resin is then washed with several portions of water (decanting after each wash) and then filtered on a Buchner funnel and washed with distilled water. The washed resin is converted into the ammonium ion form by adding concentrated ammonia until a pH between 8.3 to 9.0 is reached. The treated resin is poured into a tall glass column (75 mm. diameter) to a height of 45 cm.. The column is washed with about 9 liters of distilled water. A layer (2 to 3 cm.) of small glass beads is used to cover the resin surface. The column is not allowed to run dry.

The resin column, prepared as described above, is charged with the concentrate of the Darco G-60 eluate. The flow of the column is adjusted to a rate of about 30 ml. of liquid per minute. When all of the charge is on the column, distilled water is added and the flow rate is increased to about 100 ml. of liquid per minute. The first fraction of eluate saved is taken from the point of the first appearance of a black to dark brown color and continued to the point where the eluate is essentially colorless. When this point is reached 1 liter of 0.5% ammonium hydroxide (16.7 ml. of concentrated reagent grade ammonium hydroxide per liter of solution) is added to the column and the flow rate reduced to 40 ml. of liquid per minute. When all of the 0.5% ammonium hydroxide is on the column, 2.0% ammonium hydroxide is used and the elution is continued until a dark or "warm zone" is about 15 cm. from the bottom of the resin column marking the end of the second fraction. Elution of the column is continued collecting separate 20 ml. fractions. Optical density readings at 270 mμ are noted on dilutions (.20 ml. to 10.0 ml.) from every fifth fraction. Readings are obtained as given in the table below.

TABLE IX.—OPTICAL DENSITY OF IRC-50 COLUMN ELUATE FRACTIONS

| Fraction No. | O.D. | Fraction No. | O.D. | Fraction No. | O.D. |
|---|---|---|---|---|---|
| 1 | 0.13 | 45 | 0.13 | 90 | ∞ |
| 5 | 0.11 | 50 | 0.17 | 95 | ∞ |
| 10 | 0.12 | 55 | 0.19 | 100 | ∞ |
| 15 | 0.13 | 60 | 0.19 | 105 | 1.80 |
| 20 | 0.16 | 65 | 0.19 | 110 | 0.80 |
| 25 | 0.16 | 70 | 0.32 | 115 | 0.44 |
| 30 | 0.15 | 75 | 0.80 | 120 | 0.22 |
| 35 | 0.15 | 80 | 1.44 | 125 | 0.15 |
| 40 | 0.16 | 85 | ∞ | 130 | 0.13 |

Fractions 61 through 130 (700 ml.) are combined immediately. About 500 ml. of n-butanol is added and the mixture is concentrated to an aqueous phase of about 200 ml., pH 8.4 to 8.7. The concentrate is then shell frozen and lyophilized to yield 5.5 g. of whitish to light tan-colored, semi-purified antibiotic.

Example 4.—Purification

The semi-purified antibiotic from Example 3 is further purified and separated into two components, termed AF283α and AF283β, by either of the following two procedures: partition column chromatography on Celite or displacement chromatography using CM Sephadex cation exchanger.

Method A.—The partition system is prepared by shaking together sec-butanol and water in a proportion of 5 parts of sec-butanol to 4 parts of water, in a separatory funnel. A glass column, 2.5 inches in diameter, is packed with 600 g. of acid washed Celite wetted evenly with 400 ml. of the aqueous phase of the above system. A charge of 1.06 g. of AF283, 9 g. of acid washed Celite and 6 ml. of water are thoroughly mixed and applied to the wetted column. The column is developed with the organic upper phase collecting separate 20 ml. fractions with the use of a fraction collector. Portions of selected fractions are diluted (1 ml. to 20 ml.) and optical density readings at 270 mµ are obtained and plotted against the fraction number. Two bands, in addition to the material at the front of the column are visible. Typical readings are obtained as given in the table below.

TABLE X.—OPTICAL DENSITY OF CELITE COLUMN ELUATE FRACTIONS

| Fraction No. | O.D. | Fraction No. | O.D. | Fraction No. | O.D. |
|---|---|---|---|---|---|
| 40 | 1.04 | 85 | 0.21 | 130 | 0.14 |
| 45 | 0.47 | 90 | 0.60 | 135 | 0.13 |
| 50 | 0.37 | 95 | 1.09 | | |
| 55 | 0.70 | 100 | 1.33 | 145 | 0.13 |
| 60 | 0.88 | 105 | 1.30 | 150 | 0.12 |
| 65 | 0.58 | 110 | 1.01 | 155 | 0.11 |
| 70 | 0.20 | 115 | 0.59 | 160 | 0.09 |
| 75 | 0.13 | 120 | 0.32 | 165 | 0.09 |
| 80 | 0.13 | 125 | 0.17 | | |

Fractions 50 through 70 are combined, desolventized, and then lyophilized to yield 146 mg. of AF283α, a white fluffy solid material. Similarly, fractions 85 through 125 are combined, desolventized and then lyophilized to yield 374 mg. of AF283β, likewise, a white fluffy solid.

Method B.—In the displacement method using CM Sephadex cation exchanger, about 100 g. of CM Saphadex C-25 medium is allowed to swell in 0.1 N acetic acid (800 ml.) for 48 hours. The excess acid is decanted and the swollen exchanger washed batchwise several times with 3% ammonium formate adjusted to pH 7.5 with ammonium hydroxide. The cation exchanger is then packed into a 2-inch diameter glass column to a height of 6.5 inches. An additional 9 l. of ammonium formate is passed through the column to ensure complete equilibration. About 6.0 grams of AF283, obtained from Example 3, is stirred into a suitable quantity of ammonium formate and the charge is then percolated into the prepared column. The charged column is then developed with ammonium formate, the eluate being monitored by a Uvicord Control Unit, type 4701A, set to read ultraviolet absorption at about 254 mµ. The fraction containing AF283α (volume about 1.5 l.) is collected and kept separate from the fraction containing AF283β (volume about 7.5 l.). AF283α and AF283β are recovered from the two fractions as follows: The ammonium formate solution of the β component is passed through a column containing a mixture of 22 g. of Norit A and 22 g. of acid washed Celite. The charged column is washed with 1.6 to 2.0 l. of water to insure removal of trapped ammonium formate. AF283β is eluted from the column with about 800 ml. of 50% aqueous acetone. The eluate is concentrated under reduced pressure to an aqueous phase and lyophilized. A yield of 765 mg. of purified AF283β is obtained. The eluate containing the α component is treated in a similar manner using appropriately smaller quantities of Norit A, Celite, water, and aqueous acetone. A yield of about 80 mg. of purified AF283α is obtained.

Alternately, in other experiments the antibiotic is isolated in solid form essentially free from ammonium formate by repeated lyophilization.

The chemical analysis of each of the alpha and beta components of AF283 and the other physical and biological properties of the new antibiotics have already been described.

Example 5.—Preparation of the hydrochloride salt of AF283β

AF283β, 174 mg., is dissolved in 5 ml. of water and the solution adjusted to pH 1.3 with 6 N hydrochloric acid. Acetone is added until the solution just turns cloudy. The cloudy mixture is filtered through a sintered glass funnel. Additional acetone, 30 ml., is added to the filtrate and the mixture placed in the chillroom for several hours. The cold solution is filtered through a sintered glass funnel and a flocculent white precipitate is obtained which is washed first with acetone and then with diethyl ether. The washed salt weighs 111 mg. after drying at room temperature over $P_2O_5$ under reduced pressure.

AF283β·HCl contains the following elements in substantially the following percentages by weight:

| | |
|---|---|
| Carbon | 45.43 |
| Hydrogen | 6.30 |
| Nitrogen | 13.63 |
| Chlorine | 12.72, 12.69 |
| Oxygen (direct) | 21.21 |

The acid salt has a neutralization equivalent of 864, pKa 3.5.

Ultraviolet maxima occur at:

264 mµ ($E_{1cm}^{1\%}$=230) in 0.01 N HCl 290 mµ ($E_{1cm}^{1\%}$=275) in 0.01 N NaOH

The salt (prepared in KBr pellet) exhibits characteristic absorption in the infrared region of the spectrum at the following wavelengths expressed in microns: 2.95, 3.03, 6.01, 6.58, 6.91, 7.33, 7.94, 8.10, 8.50, 8.80, 8.91, 9.46, 12.15.

Example 6.—Preparation of the sulfate salt of AF283β

AF283β, 80 mg., is dissolved in 1 ml. of water and the solution filtered through a sintered glass funnel. Two drops of water are used as a wash. The combined filtrate and washings are adjusted to pH 2.0 with 3 N sulfuric acid. Isopropanol is added to the acidified solution dropwise until a precipitate forms (about 3 drops). The suspension is placed in a chillroom for 2 hours and then filtered. The recovered white precipitate is washed with isopropanol and dried at room temperature over $P_2O_5$ under reduced pressure.

Example 7.—Preparation of the helianthate salt of AF283β

117 mg. of AF283β are warmed in 5 ml. of distilled water and the solution is filtered through a sintered glass funnel. 10 ml. of a warm solution of methyl orange (10 mg./ml.) is added to antibiotic-containing filtrate and the mixture allowed to remain at room temperature overnight. The crystalline helianthate salt is recovered by filtration using a sintered glass funnel and washed with cold water and then dried at room temperature over $P_2O_5$; yield 98 mg.

The novel helianthate salt of AF283β contains the following elements in substantially the following percentages by weight:

| | |
|---|---|
| Carbon | 53.55 |
| Hydrogen | 5.88 |
| Nitrogen | 14.52 |
| Sulfur | 5.33 |
| Oxygen (by diff.) | 20.72 |

Ultraviolet and visible maxima occur at:

272 mµ ($E_{1cm}^{1\%}$=273) in 0.01 N HCl 316 mµ ($E_{1cm}^{1\%}$=128) in 0.01 N HCl 514 mµ ($E_{1cm}^{1\%}$=770) in 0.01 N HCl 283 mµ ($E_{1cm}^{1\%}$=335) in 0.01 N NaOH 464 mµ ($E_{1cm}^{1\%}$=504) in 0.01 N NaOH

The salt (prepared in KBr pellet) exhibits characteristic absorption in the infrared region of the spectrum at the following wavelength expressed in microns: 3.00, 6.01, 6.25, 6.58, 6.92, 7.05, 7.32, 7.61, 8.25, 8.58, 8.80, 8.96, 9.40, 9.70, 9.92, 10.35, 11.78, 12.16, 13.32, 14.35.

Example 8.—Preparation of reineckate salt of AF283β

530 mg. of AF283β are warmed in 15 ml. of distilled water and the solution filtered through a sintered glass funnel. 9.13 mg. of reineckate salt is warmed in 22 ml. of deionized water and this solution filtered through a sintered glass funnel. Both solutions are warmed to about 50° C. separately and then mixed together. The mixture is allowed to come to room temperature slowly. The reineckate salt of the antibiotic is recovered by filtration using a sintered glass funnel and washed with three separate 3 ml. portions of cold water. The washed salt is dried at room temperature over $P_2O_5$ under reduced pressure: yield 657 mg.

The reineckate salt of the antibiotic contains the following elements in substantially the following percentages by weight:

| | |
|---|---|
| Carbon | 33.34 |
| Hydrogen | 4.85 |
| Nitrogen | 19.71 |
| Sulfur | 17.78 |
| Chromium | 8.17 |
| Oxygen (by diff.) | 16.15 |

Ultraviolet maxima occur at:

304 mμ ($E_{1cm.}^{1\%}$=270) in water 268 mμ=($E_{1cm.}^{1\%}$=269) in water 304 mμ ($E_{1cm.}^{1\%}$=270) in 0.01 N HCl 266 mμ ($E_{1cm.}^{1\%}$=218) in 0.01 N HCl The salt (prepared in KBr pellet) exhibits characteristic absorption in the infrared region of the spectrum at the following wavelengths expressed in microns: 2.96, 4.72, 6.00, 6.18, 6.62, 6.91, 7.10, 7.90, 8.85, 9.43, 12.10.

Example 9.—Preparation of the benzoyl derivative of AF283β

AF283β (174 mg), sodium bicarbonate (650 mg.), water (12 ml.) are added to a test tube and shaken. The resulting mixture is filtered through a sintered glass funnel to remove a small amount of insolubles. Benzoyl chloride (0.4 ml.) is added to the filtrate and the mixture is shaken vigorously for 15 minutes, cooled and filtered through a sintered glass funnel. The precipitate is washed with cold water and dried over $P_2O_5$ under reduced pressure. The dried reaction product is washed several times with ether on a funnel. The yield of the benzoyl derivative of AF283β is 171 mg.

The novel benzoyl derivative of the antibiotic contains the following elements in substantially the following percentages by weight:

| | |
|---|---|
| Carbon | 59.14 |
| Hydrogen | 5.76 |
| Nitrogen | 11.66 |
| Oxygen (direct) | 20.84 |

Ultraviolet maxima occurs at 293 mμ ($E_{1cm.}^{1\%}$=235) in 0.01 N NaOH

The derivative (prepared in KBr pellet) exhibits characteristic absorption in the infrared region of the spectrum at the following wavelengths expressed in microns: 2.93, 3.35, 6.05, 6.30, 6.58, 6.70, 6.92, 7.15, 7.60, 7.86, 8.20, 8.50, 8.94, 9.35, 9.70, 12.15, 14.00.

Example 10.—Preparation of the p-iodobenzoyl derivative of AF283β

AF283β (100 mg.), sodium bicarbonate (400 mg.), p-iodobenzoyl chloride (810 mg.), dioxane (5 ml.), water (10 ml.) and 1 ml. of 1 N sodium hydroxide are added to a test tube. The resulting mixture is shaken vigorously for several minutes. A white flocculent precipitate is obtained on filtering. The precipitate is washed with several portions of water and then dried over $P_2O_5$ under reduced pressure. The dried precipitate, weight 454 mg., is triturated with 20 ml. of warm benzene (70° C.) and filtered. The benzene insoluble precipitate is washed with petroleum ether and air dried. The yield of the p-iodobenzoyl derivative of AF283β is 213 mg.

The p-iodobenzoyl derivative of AF283β contains the following elements in substantially the following percentages by weight:

| | |
|---|---|
| Carbon | 42.62 |
| Hydrogen | 3.74 |
| Nitrogen | 7.42 |
| Iodine | 29.41 |
| Oxygen (by diff.) | 16.81 |

The derivative (prepared in KBr pellet) exhibits characteristic absorption in the infrared region of the spectrum at the following wavelengths expressed in microns: 2.93, 5.76, 6.22, 6.30, 6.58, 6.75, 7.19, 7.93, 8.23, 8.52, 8.98, 9.30, 9.92, 11.40, 11.87, 13.35.

Example 11.—Preparation of p-bromobenzoyl derivative of AF283β

AF283β (100 mg.), sodium bicarbonate (650 mg.), p-bromobenzoyl chloride (500 mg.), dioxane (5 ml.), and water (5 ml.) are added to a test tube. The resulting mixture is shaken vigorously for 20 minutes after adjusting the pH of the mixture to 10.0 with 1 N sodium hydroxide. A white precipitate is obtained on filtering. The precipitate is washed with water and dried over $P_2O_5$ under reduced pressure. The dried precipitate, weight 215 mg., is suspended in 10 ml. of benzene, heated on a steam cone for a few minutes and filtered. The benzene insoluble precipitate is washed with petroleum ether and air dried. The yield of the p-bromobenzoyl derivative of AF283β is 159 mg.

The novel p-bromobenzoyl derivative of AF283β contains the following elements in substantially the following percentages by weight:

| | |
|---|---|
| Carbon | 47.72 |
| Hydrogen | 4.08 |
| Nitrogen | 8.65 |
| Bromine | 20.43 |
| Oxygen (direct) | 17.43 |

Ultraviolet maxima occur at:

286 mμ ($E_{1cm.}^{1\%}$=183) in 0.01 N NaOH 240 mμ ($E_{1cm.}^{1\%}$=460) in 0.01 N NaOH

The derivative (prepared in KBr pellet) exhibits characteristic absorption in the infrared region of the spectrum at the following wavelengths expressed in microns: 2.91, 5.76, 6.02, 6.29, 6.67, 6.73, 6.95, 7.15, 7.23, 7.90, 8.52, 8.97, 9.88, 11.38, 11.81, 13.30.

Example 12.—Preparation of hydrobromide salt of AF283β

AF283β, 100 mg., is dissolved in 1 ml. of water and the solution filtered through a sintered glass funnel to remove a small amount of insolubles. The filtrate is adjusted to pH 1.8 with 48% hydrobromic acid. Tetrahydrofuran is added and the cloudy mixture is placed in the chillroom for several hours after which time a solid forms on the walls of the flask. The spent liquid is decanted and the solid triturated with fresh tetrahydrofuran and scraped free from the walls of the flask. The solid is collected on a sintered glass funnel, and washed with diethyl ether and dried: yield 75 mg.

The novel AF283β hydrobromide contains the following elements in substantially the following percentages by weight:

| | |
|---|---|
| Carbon | 42.15 |
| Hydrogen | 5.82 |
| Nitrogen | 11.90 |
| Bromine | 23.96 |
| Oxygen (direct) | 17.23 |

Ultraviolet maxima occur at:

264 mμ ($E_{1cm.}^{1\%}$=213) in 0.01 N HCl 290 mμ ($E_{1cm.}^{1\%}$=265) in 0.01 N NaOH

Corresponding hydrochloride, hydrobromide, etc., salts of the alpha component may be prepared in an exactly analogous manner. Analytical data are included below.

Analysis of hydrobromide salt: C, 42.12; H, 5.63; N, 9.30; Br, 22.63; O, 18.60.

Analysis of hydrochloride salt: C, 49.53; H, 6.07; N, 9.93; Cl, 11.52; O, 21.92.

What is claimed is:

1. A substance effective in inhibiting the growth of gram-positive and gram-negative bacteria selected from the group consisting of antibiotic AF283β which in its free base form is characterized as follows:

Analysis.—Carbon, 50.28%; hydrogen, 6.77%; oxygen (direct), 26.09%; nitrogen, 15.32%; optical rotation: $[\alpha]_D^{25}$=−28.6° (±3) (c.=0.874 in 0.01 N HCl; ultraviolet maxima:

264 mμ ($E_{1cm.}^{1\%}$=255) in 0.1 N HCl 290 mμ ($E_{1cm.}^{1\%}$=315) in 0.1 N NaOH 264 mμ ($E_{1cm.}^{1\%}$=275) in methanol infrared spectrum: as shown in FIGURE 2, and salts thereof.

2. A basic substance antibiotic AF283β effective in inhibiting the growth of gram-positive and gram-negative bacteria, characterized as follows:

Analysis.—Carbon, 50.28%; hydrogen, 6.77%; oxygen (direct), 26.09%; nitrogen, 15.32%; optical rotation: $[\alpha]_D^{25}$=−28.6° (±3) (c.=0.874 in 0.01 N HCl; ultraviolet maxima:

264 mμ ($E_{1cm.}^{1\%}$=255) in 0.1 N HCl 290 mμ ($E_{1cm.}^{1\%}$=315) in 0.1 N NaOH 264 mμ ($E_{1cm.}^{1\%}$=275) in methanol infrared spectrum: as shown in FIGURE 2.

3. A substance effective in inhibiting the growth of gram-positive and gram-negative bacteria selected from the group consisting of antibiotic AF283α which in free base form is characterized as follows:

| Analysis | Percent | |
|---|---|---|
| | Mild drying conditions | Extensive drying conditions |
| Carbon | 51.08 | 53.15 |
| Hydrogen | 7.59 | 6.34 |
| Oxygen (direct) | 27.88 | 26.35 |
| Nitrogen | 11.83 | 11.33 | optical rotation: $[\alpha]_D^{25}$=−6.1° (±2.3) (c.=1.310 in 0.1 N HCl);
ultraviolet maxima:

263 mμ ($E_{1cm.}^{1\%}$=310) in 0.1 N HCl 290 mμ ($E_{1cm.}^{1\%}$=390) in 0.1 N NaOH infrared spectrum: as shown in FIGURE 1, with salts thereof.

4. A basic substance antibiotic AF283α effective in inhibiting the growth of gram-positive and gram-negative bacteria, charactertized as follows:

| Analysis | Mild drying conditions | Extensive drying conditions |
|---|---|---|
| Carbon | 51.08 | 53.15 |
| Hydrogen | 7.59 | 6.34 |
| Oxygen (direct) | 27.88 | 26.35 |
| Nitrogen | 11.83 | 11.33 | optical rotation: $[\alpha]_D^{25}$=6.1° (±2.3) (c.=1.310 in 0.1 N HCl);
ultraviolet maxima:

263 mμ ($E_{1cm.}^{1\%}$=310) in 0.1 N HCl 290 mμ ($E_{1cm.}^{1\%}$=390) in 0.1 NaOH infrared spectrum: as shown in FIGURE 1.

5. A compound selected from the group consisting of antibiotic AF283β as characterized in claim 2 and antibiotic AF283α as characterized in claim 4.

6. A process which comprises cultivating *Streptomyces filipinensis* NRRL 3217 in an aqueous nutrient medium containing assimilable sources of carbohydrate, nitrogen and inorganic salts under submerged aerobic conditions for a period of from 65 to 90 hours and at a temperature of from 25 to 29° C. until substantial antibiotic activity is imparted to said medium by the production of a compound as characterized in claim 5, and is separated into two components AF283β and AF283α by partition column chromatgraphy.

References Cited

Miller, The Pfizer Handbook of Microbial Metabolites, McGraw-Hill Book Company, Inc., New York, pages 126 and 127, January 1962.

ALBERT T. MYERS, *Primary Examiner.*

JEROME D. GOLDBERG, *Assistant Examiner.*

U.S. Cl. X.R.

195—80